United States Patent [19]
Kinoshita et al.

[11] Patent Number: 5,527,638
[45] Date of Patent: Jun. 18, 1996

[54] HYDROGEN STORAGE ALLOY ELECTRODE AND SEALED-TYPE NICKEL-METAL HYDRIDE STORAGE BATTERY USING THE SAME

[75] Inventors: Kazushige Kinoshita; Takashi Okawa, both of Fujisawa; Takashi Takano; Toshihisa Hiroshima, both of Chigasaki, all of Japan

[73] Assignee: Matsushita Electric Industrial Co., Ltd., Osaka, Japan

[21] Appl. No.: 265,293

[22] Filed: Jun. 24, 1994

[30] Foreign Application Priority Data

Jun. 30, 1993 [JP] Japan .................................. 5-162127

[51] Int. Cl.[6] .................................................. H01M 4/62
[52] U.S. Cl. ................. 429/101; 429/59; 429/188; 429/217; 429/218; 429/233; 429/241; 420/900
[58] Field of Search ............................. 429/59, 101, 218, 429/217, 233, 241, 188; 420/900

[56] References Cited

U.S. PATENT DOCUMENTS 5,053,292  10/1991  Hasebe et al. .................... 429/101

FOREIGN PATENT DOCUMENTS

| | | |
|---|---|---|
| 0149846 | 7/1985 | European Pat. Off. . |
| 0284063 | 9/1988 | European Pat. Off. . |
| 0386305 | 9/1990 | European Pat. Off. . |
| 0419221 | 3/1991 | European Pat. Off. . |
| 53-074242 | 7/1978 | Japan . |
| 61-163569 | 7/1986 | Japan . |
| 2135665 | 5/1990 | Japan . |
| 2291665 | 12/1990 | Japan . |
| 3141554 | 6/1991 | Japan . |
| 4342966 | 11/1992 | Japan . |

OTHER PUBLICATIONS

T. Hara et al., "New Binding Materials for Metal Hydride Electrodes which Permit Good Recycleability", *J. Electrochem. Soc.* 140:9 (Sep. 1993) pp. 2450–2454.

*Primary Examiner*—M. Nuzzolillo
*Attorney, Agent, or Firm*—Panitch Schwarze Jacobs & Nadel

[57] ABSTRACT

A hydrogen storage alloy electrode comprising, an electrically conductive support made of a punched or perforated metal sheet, a mixture supported on said conductive support and a water-repellent agent for giving a water-repellent property on the surface of the electrode, said mixture including; a hydrogen storage alloy powder, a styrene-butadiene copolymer having a styrene to butadiene weight ratio in a range of 100:30 to 100:100 as a binder, a polymeric material for giving a hydrophilic property inside the electrode, and carbon black for giving a hydrophobic property inside the electrode.

16 Claims, 4 Drawing Sheets

HYDROGEN STORAGE ALLOY ELECTRODE AND SEALED-TYPE NICKEL-METAL HYDRIDE STORAGE BATTERY USING THE SAME

BACKGROUND OF THE INVENTION

1. Field of the Invention

The present invention relates to a hydrogen storage alloy electrode and to a sealed-type nickel-metal hydride storage battery using the same electrode.

2. Description of the Related Art

A nickel-cadmium storage battery is well known as one of sealed-type alkaline storage batteries which has recently been utilized in a variety of applications. Recently, as a battery system having a higher energy density than batteries currently available, the nickel-metal hydride storage batteries are being developed by utilizing a negative electrode comprising a metal hydride, i.e., a hydrogen storage alloy, capable of absorbing or desorbing hydrogen in a reversible manner at a low pressure. In order to realize such a hydrogen storage alloy electrode as the negative electrode of the nickel-metal hydride storage battery, the following processes have been proposed so far.

(1) A process of producing the electrode by sintering a powder of the hydrogen storage alloy together with a powder of an electrically conductive agent.

(2) A process of producing the electrode by filling or loading a powder of the hydrogen storage alloy in a three-dimensional porous metal substrate such as foamed nickel.

(3) A process of producing the electrode by causing a two-dimensional conductive support such as a punched or perforated sheet of conductor or metal to hold a mixture comprising a powder of the hydrogen storage alloy and a high polymer binder such as polytetrafluoroethylene.

Incidentally, a sealed-type alkaline storage battery configured with a hydrogen storage alloy electrode is usually designed so that the capacity of the negative electrode is larger than the capacity of the positive electrode as in the design of the nickel-cadmium storage battery. This design enables the battery to lower the inner pressure of the battery vessel, by consuming oxygen gas generated from the positive electrode during the overcharging process at the negative electrode. In addition to the generation of the oxygen gas from the positive electrode as in the case of the nickel-cadmium storage battery, the alkaline storage battery configured with the hydrogen storage alloy electrode further suffers an excessive rise in the inner pressure caused by an accumulation of hydrogen gas generated from the negative electrode.

In order to cope with this difficulty, there has been proposed a method of providing a water-repellent layer on the surface of the electrode and another method of providing a part demonstrating a hydrophilic property inside the electrode.

The negative electrode, having a two-dimensional conductive support such as a punched or perforated metal sheet as described in the above-mentioned (3), is usually rolled-up together with the positive electrode spaced by a separator in a spiral arrangement. During this rolling-up process, if the distance along a straight line linking centers of the adjacent apertures in the punched or perforated metal sheet is long, the electrode would be bent polygonally instead of circularly, thereby causing the electrode to be liable to produce cracks with burrs. If the cracks are once produced, sharp edges or burrs project into or pierce through the separator, resulting in a local short-circuiting. In this manner, a defective battery attributable to leakage current between the positive and negative electrodes may be produced.

In order to cope with this defect, a method has been proposed such that the punched or perforated metal sheet is so prepared as to have a regular perforation pattern wherein any three centers of the adjacent apertures constitute an equilateral triangle and that the electrode is rolled-up in a direction parallel to one side of any equilateral triangle.

The sintering process as described in the abovementioned (1) has a disadvantage that the surface of the hydrogen storage alloy may be oxidized to a passive state during the sintering step, and the conductivity of the electrode is lowered, thereby inviting a lowering of discharge voltage.

In addition to the inherent expensiveness of the three-dimensional porous metal substrate, the process as described in the above-mentioned (2) has a disadvantage that the produced electrode contains a portion which does not contribute to the electrode capacity in a large proportion and thus the process cannot produce an electrode of sufficient electrode capacity for the space occupied by the electrode.

The process as described in the above-mentioned (3) has a disadvantage that the process requires an addition of the high polymer binder in large quantity for causing the punched or perforated metal sheet to hold the hydrogen storage alloy powder with a sufficient bonding strength. If the large quantity of the binder is added, the conductivity of the electrode would however be lowered accordingly, thereby inviting a lowering of discharge voltage. Another disadvantage is that the electrode capacity cannot be made sufficiently large.

Further, although the above-mentioned method of providing the water-repellent layer on the surface of the electrode or providing the part demonstrating the hydrophilic property inside the electrode contributes to the lowering of the inner pressure of the battery enclosure, it has a disadvantage that it cannot satisfactorily cope with such an application as to include a rapid charging of, for instance, one hour rate or less.

Moreover, although the above-mentioned configuration of the punched or perforated metal sheet can improve the bent state of the electrode to approximate a true circle to a certain extent, it cannot however reduce fraction defects of the electrode attributable to the short-circulating a great deal.

SUMMARY OF THE INVENTION

It is therefore a primary object of the present invention to provide an improvement on or relating to the electrode produced according to the method disclosed in the abovementioned (3). By this improvement, the present invention provides a hydrogen storage alloy electrode having a large discharge capacity, an excellent charging and discharging cycle life, and no excessive rise in the inner pressure during a rapid charging process.

It is another object of the present invention to provide a hydrogen storage alloy electrode that produces a very small number of rejects due to short-circuiting when it is rolled-up in a spiral arrangement.

It is a further object of the present invention to provide a sealed-type nickel-metal hydride storage battery configured with the above-mentioned hydrogen storage alloy electrode as its negative electrode.

The present invention provides a hydrogen storage alloy electrode comprising, an electrically conductive support made of a punched or perforated metal sheet, a mixture supported on the electrically conductive support, and a water-repellent agent for giving a water-repellent property on the surface of the electrode, said mixture including;

a hydrogen storage alloy powder, a styrene-butadiene copolymer having a styrene to butadiene weight ratio in a range of 100:30 to 100:100, as a binder, a polymeric material for giving a hydrophilic property inside the electrode, and carbon black for giving a hydrophobic property inside the electrode.

In a preferred embodiment of the present invention, the proportion of the styrene-butadiene copolymer in the mixture may be in a range from 0.3 to 2.0 parts by weight for 100 parts by weight of the hydrogen storage alloy powder.

In another preferred embodiment of the present invention, the punched or perforated metal sheet may have a regular perforation pattern comprising a plurality of apertures each having a diameter in a range from 1.0 mm to 2.5 mm, arranged in isosceles triangles which satisfy a condition that its vertical angle of the triangle formed with lines linking any three centers of the adjacent apertures is smaller than both base angles, and may further have margins (parts without perforation) along at least a pair of facing peripheral edges surrounding the perforated area of the punched or perforated metal sheet.

Moreover, it is preferable for the polymeric material for giving a hydrophilic property inside the electrode to be a sodium salt of carboxymethyl cellulose, and for the proportion of the salt in the mixture to be in a range from 0.05 to 2.0 parts by weight for 100 parts by weight of the hydrogen storage alloy powder.

The proportion of the carbon black in the mixture is preferably in a range from 0.05 to 1.5 parts by weight for 100 parts by weight of the hydrogen storage alloy powder.

It is preferable for the water-repellent agent to be polytetrafluoroethylene or a copolymer of tetrafluoroethylene and hexafluoropropylene, and for the amount of the agent adhered to unit surface area of the electrode to be in a range from 0.1 to 1.0 mg/cm$^2$.

The present invention also provides a sealed-type nickel-metal hydride storage battery comprising an electrode assembly including a negative electrode composed of the above-mentioned hydrogen storage alloy electrode, a nickel positive electrode and a separator, an alkaline electrolyte, a sealed-type battery enclosure provided with a safety valve unit for accommodating the electrode assembly and the electrolyte.

Further, in a preferred embodiment of the present invention, the above-mentioned hydrogen storage alloy electrode is rolled-up in the direction parallel to the base of the isosceles triangle together with the positive electrode and the separator provided between the two electrodes to form a cylindrical roll with a spiral section. In the cylindrical roll thus formed, the base of the isosceles triangle exists on a plane perpendicular to the axis of the cylindrical roll.

While novel features of the invention are set forth in the precedings, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Figure 1:
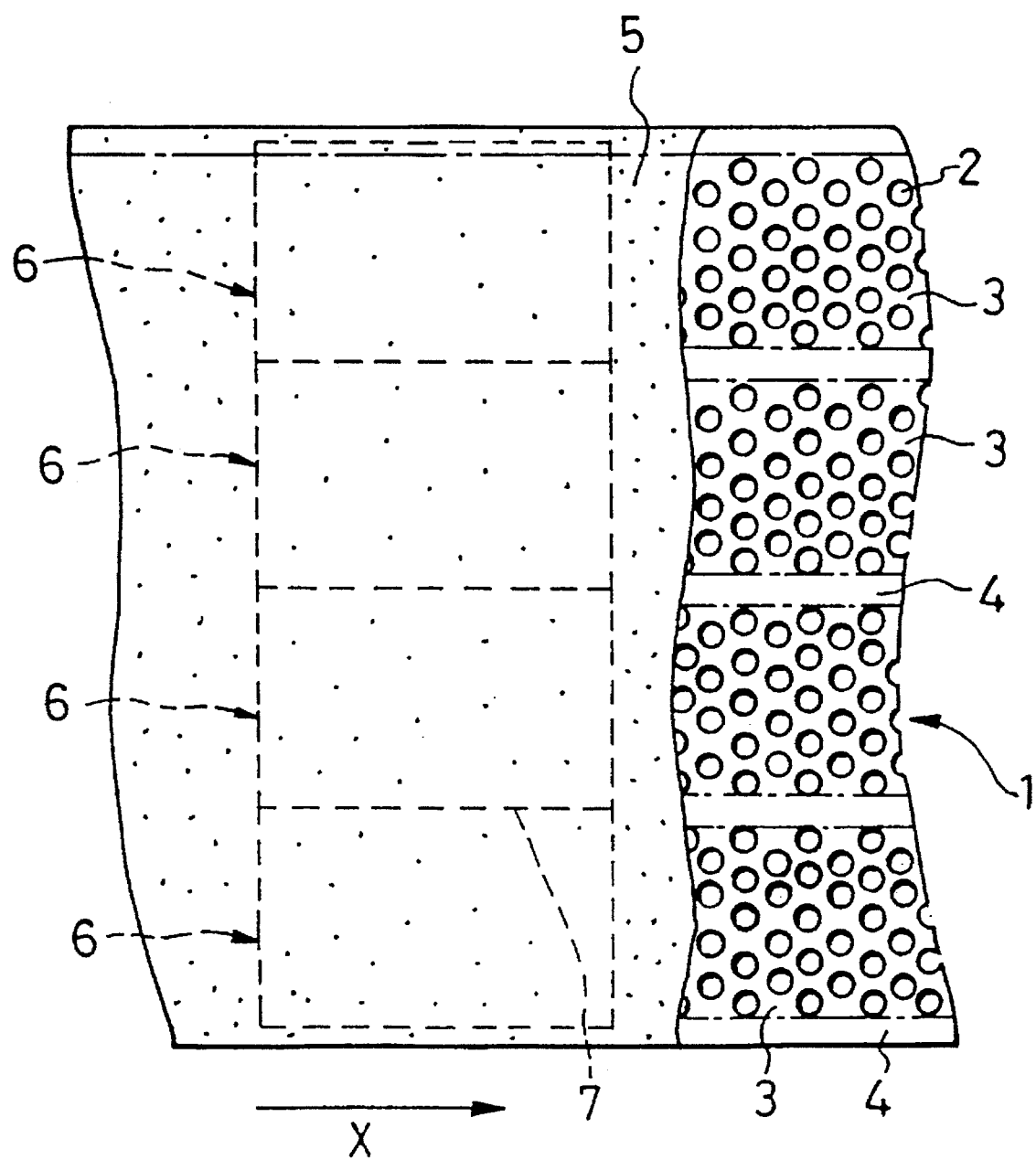
FIG. 1 is a partly cut-out plan view showing the electrode prepared by coating a punched or perforated metal sheet with a mixture containing a hydrogen storage alloy powder, in an embodiment of the present invention.

The hydrogen storage alloy electrode of the present invention has a small decrease in the capacity of the battery configured with the electrode attributable to the repetition of the charging and discharging processes and an excellent cycle life. These advantageous features are obtained by adding a styrene-butadiene copolymer resin as a binder or binding medium, a high polymer capable of producing a hydrophilic property inside the electrode and carbon black for giving a hydrophobic property on the electrode, to a mixture consisting mainly of the hydrogen storage alloy powder for coating the punched or perforated metal sheet, and by providing a water repellent layer on the surface of the electrode with a water-repellent agent. By the coexistence of the hydrophilic property and the hydrophobic property inside the electrode, the absorption rate of the generated gas is made high and thus an excessive rise in the inner pressure of the battery enclosure is effectively prevented.

Elastic Polymer As The Binder

The present inventors have now found that among various thermoplastic resins and elastic polymers, a styrene-butadiene copolymer having a specified styrene to butadiene ratio can give a sufficient mechanical strength to the mixture even with a small amount of addition, and can give an electrode capable of coping with expansion and contraction of the hydrogen storage alloy powder attributable to the charging and discharging processes. The copolymer in the coated layer solidifies the mixture comprising the hydrogen storage alloy powder by being cured with the progress of three-dimensional cross-linking reaction with heat applied at a drying step. An excessive heating however leads to an undesirably rapid progress of the cross-linking reaction, and is not suitable for the purpose because it gives a cured copolymer having a rigid or brittle property. In the drying step, it is therefore appropriate to heat the coated support at a temperature ranging from 90° C. to 110° C. for a time period in a range from 15 minutes to 30 minutes.

The weight ratio of styrene to butadiene in the styrene-butadiene copolymer is preferably in a range from 100:30 to 100:100. If the amount of butadiene is smaller than the least value of the above-mentioned range, flexibility or elasticity of the electrode is lowered and the discharge capacity is decreased accordingly. When the flexibility or elasticity of the electrode is lowered, a force attributable to the volumetric change (expansion and contraction) of the electrode attributable to the repetition of charging and discharging process will be enlarged, thereby to lower the bonding force among the alloy particles or between the alloy particles and the punched or perforated metal sheet, resulting in a decrease in the discharge capacity. If the amount of butadiene is larger than the largest value in the above-mentioned range, possible falling-off of the alloy powder can be prevented by the butadiene-rich copolymer, though contact resistances among the alloy powder particles attributable to the volumetric expansion is increased, thereby inviting a decrease in the discharge capacity.

The proportion of the styrene-butadiene copolymer in the mixture is also important. The proportion of the copolymer is suitably in a range from 0.3 to 2.0 parts by weight for 100 parts by weight of the hydrogen storage alloy powder. If the proportion of the styrene-butadiene copolymer is smaller than the above-mentioned least value, it is impossible to bond the mixture including the hydrogen storage alloy powder to the punched or perforated metal sheet with sufficient bonding strength to produce the electrode. Even if the electrode is produced, the strength of the resultant electrode is very small and the once adhered hydrogen storage alloy powder easily falls off. If the proportion of the styrene-butadiene copolymer is larger than the above-mentioned largest value, although the electrode strength is enlarged by the large proportion of the copolymer, the gas absorption rate becomes slow because the part of the hydrogen storage alloy powder covered with the abovementioned copolymer becomes large and the inner pressure of the battery enclosure is raised accordingly. The increased inner pressure may produce a liquid leakage and deteriorate the service life of the battery.

Punched or Perforated Metal Sheet

In the following paragraphs, description will be made on the punched or perforated metal sheet with reference to the drawings.

Figure 3:
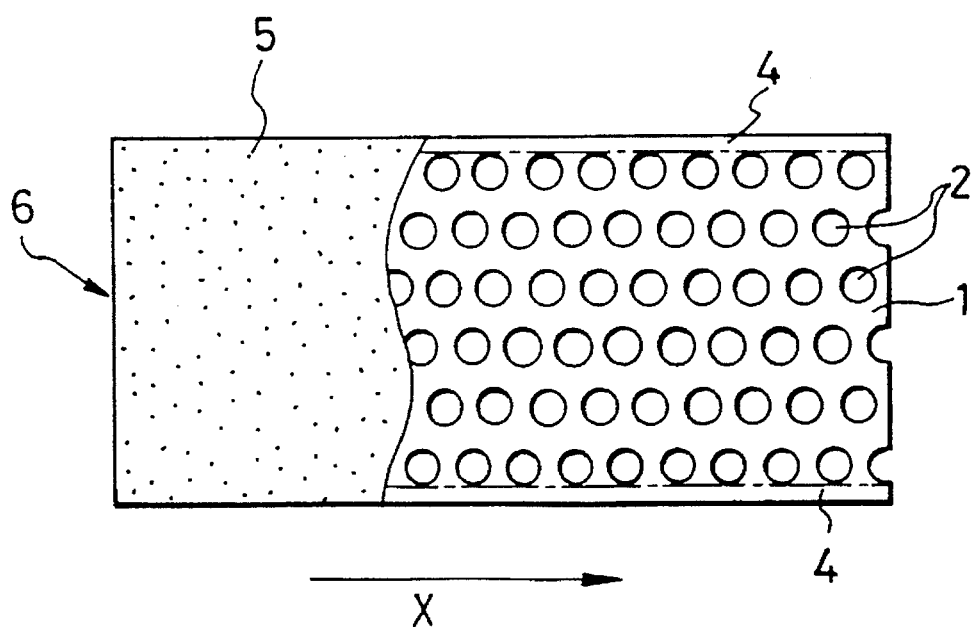
FIG. 3 is a partly cut-out plan view showing the electrode in the embodiment of the present invention.

FIG. 1 is a partly cut-out plan view showing the electrode configured with the punched or perforated metal sheet coated with a mixture containing a hydrogen storage alloy powder. The punched or perforated metal sheet 1 has been prepared by perforating a long belt-like bulk sheet while it is being delivered or fed in its lengthwise direction, and has a regular perforation pattern, wherein perforated areas 3 having a plurality of apertures and non-perforation belt shaped areas 4 with no aperture are arranged in parallel with one another in the lengthwise direction. While delivering or feeding the punched or perforated metal sheet 1 in its lengthwise direction indicated by X, the surfaces of both sides of the sheet 1 are coated with the mixture 5 containing the hydrogen storage alloy powder. The sheet thus coated with the mixture is then dried and pressed. Thereafter, the coated bulk sheet is cut into individual electrodes 6 of a predetermined size. Dotted lines 7 in this figure indicate lines along which the bulk sheet is cut into the individual electrodes 6. An enlarged plan view of the electrodes is shown in FIG. 3.

Figure 2:
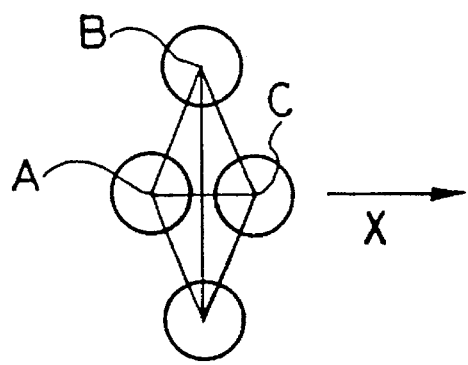
FIG. 2 is a diagram showing a perforation pattern of a punched or perforated metal sheet and direction of rolling-up the electrode in the embodiment of the present invention.

The perforation pattern in the above-mentioned punched or perforated metal sheet is illustrated in detail by FIG. 2. That is, all apertures are arranged in a regular pattern comprising a plurality of isosceles triangles. More specifically, in the regular pattern, its vertical angle $\angle ABC$ of any isosceles triangle ABC formed with lines linking centers A, B and C of the adjacent three apertures is smaller than either of the two base angles $\angle BAC$ and $\angle BCA$.

An electrode is configured by coating the punched or perforated metal sheet having the abovementioned regular perforation pattern with a mixture composed mainly of the hydrogen storage alloy powder. The electrode thus obtained is rolled-up in the direction X which is parallel to the base AC of the above-mentioned isosceles triangle, and formed into such a cylindrical roll with a spiral section that the base of the abovementioned isosceles triangle exists on a plane perpendicular to the axis of the cylindrical roll. In this manner, the electrode can be rolled-up in a cylindrical roll with a spiral section to have a curved surface which approximates to a true circular surface without producing any crack in the electrode, thereby reducing the fraction defects due to the partial short-circuiting between the positive and negative electrodes a great deal.

In the above-mentioned perforation pattern, the triangles constituting the regular perforation pattern are preferably such triangles having the vertical angle of from 46° to 58° and the base angles of from 67° to 61°. If the vertical angle is smaller than 46°, the base of the isosceles triangle becomes short, and the distance between the adjacent apertures whose centers are A and C becomes narrow accordingly. For this reason, the punched or perforated metal sheet is made liable to be broken.

Incidentally, the punched or perforated metal sheet is prepared in general by perforating a long belt-like bulk sheet while it is being delivered or fed in its lengthwise direction. And, while delivering or feeding the punched or perforated metal sheet in its lengthwise direction, it is coated with the mixture consisting mainly of the hydrogen storage alloy powder, then dried and pressed. After the bulk sheet is cut into the individual electrodes of the predetermined size, the individual electrode is rolled-up in the direction parallel to the base of the triangle which coincides with the direction of the delivery.

If the distance between the apertures A and C is narrow as mentioned above, the punched or perforated metal sheet develops an extension along its direction of the delivery when it is pressed after being coated with the mixture consisting mainly of the hydrogen storage alloy powder. For this reason, an electrode having a uniform coating layer cannot be obtained if the distance is too narrow.

It has been found by our experiments that if the vertical angle is larger than 58°, rolling-up of the electrode in a curved surface in substantially true circular surface is difficult, and the resultant surface becomes a polygonal surface.

According to our experimental study on the above-mentioned punched or perforated metal sheet, diameters of the apertures are desirably in a range from 1.0 mm to 2.5 mm, and more preferably 2.0 mm or smaller. If the diameter of the aperture is larger than 2.5 mm, the punched or perforated metal sheet is irregularly deformed instead of being bent along a straight line linking centers of the apertures (in the direction perpendicular to the rolled-up direction), thereby producing sharp edges or burrs which project from part of the surface of the electrode. The produced sharp edges or burrs sometimes produce defective electrode due to partial short-circuiting.

On the other hand, if the diameter of the aperture is smaller than 1.0 mm, it is difficult to provide the bulk steel sheet with an intended aperture rate by a perforation process. In order to attain the intended aperture rate with the smaller apertures, numbers of pins in a punching press and times or repetition of the perforation process should be increased, thereby increasing the manufacturing cost of the punched or perforated metal sheet. In addition to this, if the diameter of the pins in the punching press is smaller than 1.0 mm, the mechanical strength of the pins is insufficient and thus liable to be broken, and the pins themselves are incapable of withstanding a pressure applied at the perforation process.

Suitable aperture ratio of the punched or perforated metal sheet itself is in a range from 35% to 61%. If the aperture ratio is smaller than the least value of the above-mentioned range, volume of the punched or perforated metal sheet itself occupying in the total volume of the electrode becomes undesirably large, and an electrode of high discharge capacity can not be obtained. Further, bonding strength between the coating layers on both surfaces of the punched or perforated metal sheet is reduced and the coating layers become to be liable to fall off. Conversely, if the aperture ratio is larger than the largest value of the above-mentioned range, the mechanical strength of the punched or perforated metal sheet itself is reduced. The sheet with the reduced mechanical strength cannot be subjected to a subsequent continuous processing such as coating and pressing.

The thickness of the punched or perforated metal sheet is preferably in a range from 40 μm to 80 μm. If it is thinner than 40 μm, the mechanical strength is insufficient; and if it is thicker than 80 μm, an electrode of high discharge capacity is not obtained.

The provision of non-perforation belt-shaped areas which has no apertures along the peripheral edges of the punched or perforated metal sheet surrounding its perforated region is effective for preventing the falling-off of the hydrogen storage alloy powder from the resultant electrode and the generation of the sharp edges and burrs which are the cause for the partial short-circuiting during the rolling-up process of the electrode.

Figure 6:
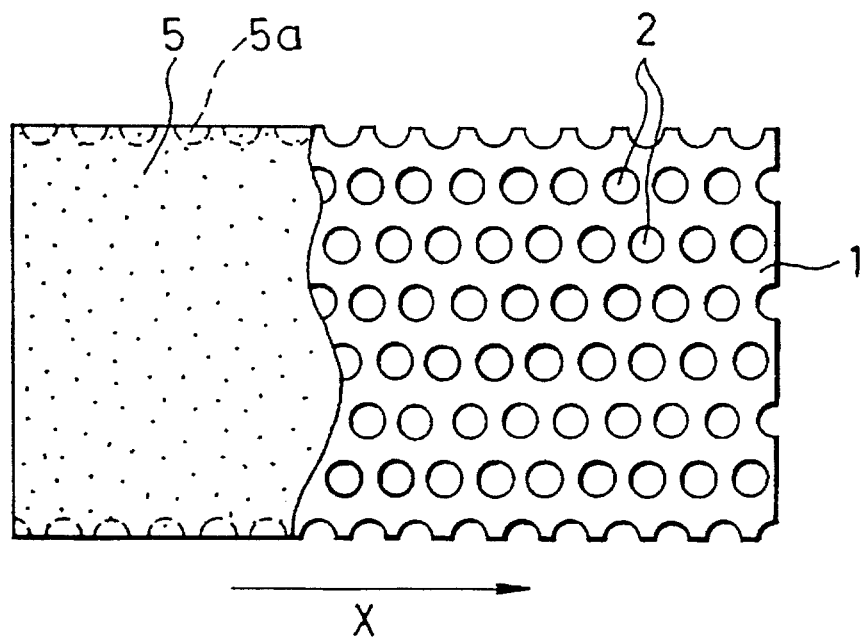
FIG. 6 is a partly cut-out plan view showing the electrode configured with a punched or perforated metal sheet in a comparative example.

That is, the electrode is configured by cutting a bulk punched or perforated metal sheet usually in a long belt into a size of the individual electrodes, after the bulk sheet is coated with a mixture containing the hydrogen storage alloy powder in general. Unless the perforation pattern is set so that the margins along the peripheral edges of the individual electrode may be produced at the cutting process, the resultant individual electrode will sometimes be such that as shown in FIG. 6.

If the individual electrode is cut along a part including the apertures, the coated hydrogen storage alloy powder 5a filled in the apertures having the cutting line therein would easily fall off from the punched or perforated metal sheet, and the sharp edges or burrs would be produced along the peripheral edges of the punched or perforated metal sheet, thereby causing a short-circuiting during the rolling-up process of the electrode.

Figure 4:
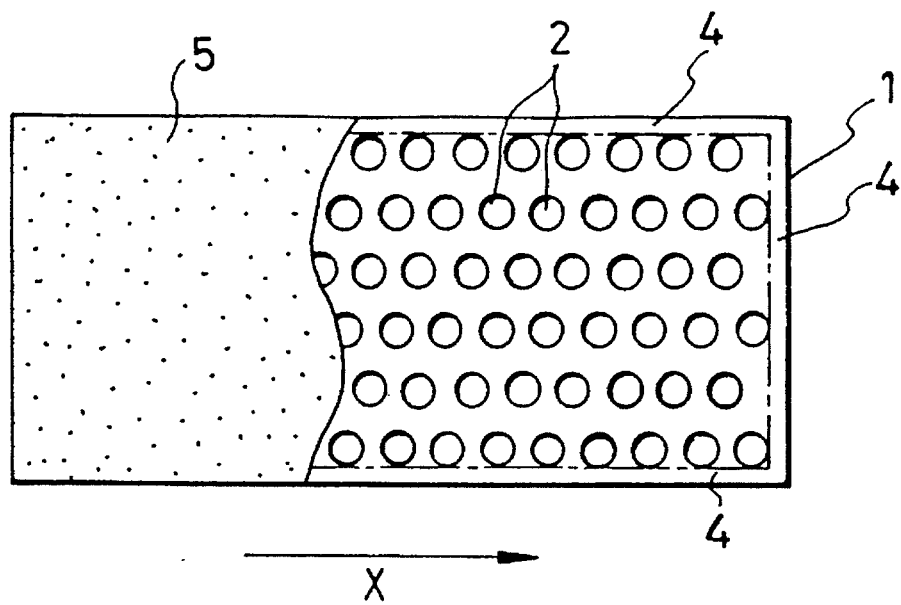
FIG. 4 is a partly cut-out plan view showing the electrode in another embodiment of the present invention.

The perforation pattern of the punched or perforated metal sheet in accordance with the present invention is set in a manner that the margins with no aperture are produced along at least a pair of facing peripheral edges on both sides of the individual electrode, preferably a pair of peripheral edges parallel to the base of the isosceles triangle as shown by FIG. 3. It is more preferable to set the perforation pattern so that the margins are produced along all of the four sides of the individual electrode as shown by FIG. 4.

Electrode Reactions

In a sealed-type alkaline storage battery configured with a positive nickel electrode comprising nickel hydroxide as the electrode active material, and a negative electrode comprising the hydrogen storage alloy, it is considered that reactions represented by the following formulae (1) and (2) take place in the vicinity of the negative electrode in general.

$$M+H_2O+e^- \rightarrow MH+OH^- \quad (1)$$

$$M+\tfrac{1}{2}H_2 \rightarrow MH \quad (2)$$

Further, in the overcharging process, a reaction represented by the formula (3) takes place as a competitive reaction of the formulae (1) and (2).

$$H_2O+e^- \rightarrow \tfrac{1}{2}H_2+OH^- \quad (3)$$

Similarly in the overcharging process, a reaction represented by the formula (4) takes place at the positive electrode and oxygen gas is generated therefrom.

$$2OH^- \rightarrow H_2O+\tfrac{1}{2}O_2+2e^- \quad (4)$$

The generated oxygen gas is consumed by the hydrogen storage alloy according to a reaction represented by the formula (5).

$$2MH+\tfrac{1}{2}O_2 \rightarrow 2M+H_2O \quad (5)$$

As illustrated by the above-mentioned formulae, the oxygen gas generated by the reaction of the formula (4) is absorbed at the surface of the hydrogen storage alloy by the reaction of the formula (5), thereby generating water.

Theoretically, as the gas generating reactions during the overcharging process, the hydrogen gas generating reaction of the formula (3) which is the competitive reaction of the formula (1) takes place in the battery as a whole, and the oxygen gas generating reaction of the formula (4) takes place at the positive electrode.

As the gas absorption reactions, the hydrogen gas absorption reaction of the formula (2) takes place in the vicinity of the hydrogen storage alloy, and the oxygen gas absorption reaction of the formula (5) takes place on the surface of the negative electrode.

According to the present invention, the rate of the oxygen gas absorption reaction of the formula (5) is accelerated by a formation of a solid-gas interface inside the electrode with the hydrophobic carbon black incorporated into the mixture consisting mainly of the hydrogen storage alloy powder, and water consumption rate according to the reaction of the formula (1) is accelerated by a formation of a solid-liquid interface inside the electrode with the hydrophilic sodium salt of carboxymethyl cellulose. In this manner, these interfaces effectively suppress the rise in the inner pressure of the battery enclosure in a great deal during the overcharging process.

Hydrophobic Carbon Black

As a result of elaborate experiments, the present inventors have found that as the carbon powder to be added to the mixture, a material belonging to the class of carbon black is preferable to that of the graphite. The carbon black material is more excellent in the adhesivity to the hydrogen storage alloy powder than the graphite material, and, when a paste for coating is prepared by incorporating the material, it gives an appropriate viscosity to the paste. Among the carbon powders of the class of carbon black, there are channel black, thermal black and furnace black, though the furnace black demonstrated a favorable performance. In the embodiments of the present invention, the furnace black is used.

The proportion of the hydrophobic carbon black to be added to the mixture is preferably in a range from 0.05 to 1.5 parts by weight for 100 parts by weight of the hydrogen storage alloy powder. If the proportion is smaller than the least value, the oxygen gas absorption rate is made slow, and conversely, if the proportion is larger than the largest value, the water consumption rate is decreased, thereby raising the inner pressure of the battery. The mean particle size of the carbon black is preferably in a range from 10 nm to 60 nm.

Hydrophilic Carboxymethyl Cellulose

As a result of empirical investigations on various paste-forming material as the hydrophilic property producing agent, the present inventors have found that sodium salt of carboxymethyl cellulose can give a favorable viscosity to the paste for coating. Its proportion to be added to the mixture is preferably in a range from 0.05 to 2.0 parts by weight for 100 parts by weight of the hydrogen storage alloy powder. If the proportion is smaller than the least value, the water consumption rate is made slow, and conversely, if the proportion is larger than the largest value, the hydrogen gas absorption rate is decreased, thereby raising the inner pressure of the battery.

Water-repellent Layer

The oxygen gas generated from the positive electrode during the overcharging process is absorbed mainly at the surface of the negative electrode. It is therefore necessary to form a further powerful solid-gas interface in the vicinity of the surface of the negative electrode than that inside the electrode. As the water-repellent agent which can bring a sufficient water-repellent property on the electrode surface even with its small amount of addition, a fluorocarbon resin of polytetrafluoroethylene or a copolymer of tetrafluoroethylene and hexafluoropropylene is preferable. The amount of the water-repellent agent to be applied to unit area of the surface of the electrode is preferably in a range from 0.1 to 1.0 mg/cm$^2$. If the amount is less than the least value, the absorption rate of the oxygen gas is made slow, and conversely, if the amount is more than the largest value, the water consumption rate is made slow, thereby raising the inner pressure of the resultant battery in both cases.

In the following paragraphs, examples of the present invention will be described together with comparative examples by referring to the attached drawings.

EXAMPLE 1

Electrode Mixture

Each of the predetermined amounts of commercially available Mm (misch metal), Ni, Co, Mn and Al were mixed and the obtained mixture was heated to be molten by means of an arc melting process. By cooling the molten mixture, a hydrogen storage alloy whose composition is represented by the formula: $MmNi_{3.55}Co_{0.75}Mn_{0.4}Al_{0.3}$ was produced. After the alloy was pulverized by a grinding mill to have a particle size of 37 μm or smaller, the whole was soaked in a hot alkaline aqueous solution, washed with water and then dried. In the abovementioned formula, Mm is a mixture of rare earth elements composed of 33% by weight of La, 48% by weight of Ce, 4% by weight of Pr, 14% by weight of Nd and 1% by weight of other elements.

To 100 parts by weight of the hydrogen storage alloy powder, added 0.15 parts by weight of sodium salt of carboxymethyl cellulose (hereinafter referred to "CMC"), 0.30 parts by weight of carbon black (furnace black) having a mean particle size of 30 nm, 0.8 parts by weight of styrene-butadiene copolymer (hereinafter referred to "SBR") whose styrene to butadiene weight ratio is 100:68, and 14 parts by weight of water as a dispersing medium or dispersant, and the whole was kneaded to prepare a paste.

Electrode Support

Separate from this, a conductive electrode support for holding the electrode mixture was produced in the following manner. First, a punched or perforated metal sheet was produced by providing a plurality of apertures each having a diameter of 1.0 mm at an aperture rate of 43%, arranged in a regular perforation pattern composed of a plurality of isosceles triangle formed with lines linking any three centers of the adjacent apertures, wherein the vertical angle is 56° and the base angles are 62°, respectively. The punched or perforated metal sheet was prepared from a raw material of cold-rolled steel sheet of a thickness of 60 μm, whose surface was nickel-plated to a thickness of about 2–3 μm after the perforation process.

Electrodes

The punched or perforated metal sheet was coated on both surfaces thereof with the above-mentioned paste, then dried for 20 minutes in a drying furnace at 100° C. and pressed with a pressure roller. On both surfaces of the coated sheet, an aqueous dispersion of polytetrafluoroethylene (hereinafter referred to "PTFE") was applied by spraying for providing a water-repellent layer having an applied amount of PTFE for the unit area of the electrode surface of 0.5 mg/cm$^2$. The coated sheet was cut into the individual electrodes each having the predetermined size. In this example, the perforation pattern was selected in a manner that the margins with no aperture were produced along the facing peripheral edges on both sides of the electrode as shown in FIG. 3. This was named "Electrode A".

Next, in a manner similar to those in the abovementioned, except for the uses of SBRs having the styrene to butadiene weight ratios of 100:40 and 100:90, respectively, Electrodes B and C were produced.

Further, in a manner similar to those for the production of Electrode A, except for the proportions of SBR, whose styrene to butadiene weight ratio is 100:68 of 0.4 and 2.0 parts by weight for 100 parts by weight of the hydrogen storage alloy powder respectively, Electrodes D and E were produced.

As comparative examples, Electrodes F and G were produced in a manner similar to those for Electrode A, except for the uses of SBRs, whose styrene to butadiene weight ratios were 100:20 and 100:120, respectively.

Further, also as comparative examples, Electrodes H and I were produced in a manner similar to those for Electrode A, except for the uses of SBR, whose styrene to butadiene weight ratio was 100:68, in the amounts to be added were 0.1 and 3.0 parts by weight for 100 parts by weight of the hydrogen storage alloy powder, respectively.

Moreover, Electrode J was produced in a manner similar to those for Electrode A, except for the use of PTFE instead of SBR, and for the amount of its addition of 0.7 parts by weight for 100 parts by weight of the hydrogen storage alloy powder.

Electrode Assembly

Each of these hydrogen storage alloy electrodes A through J was combined with a non-sintered type nickel positive electrode comprising nickel hydroxide powder as an electrode activate material and a separator comprising a non-woven fabric of sulfonation-treated polypropylene. To obtain an electrode assembly, each of the combined bodies was rolled-up in a spiral arrangement in a direction parallel to the base of the isosceles triangle in the regular perforation pattern of the punched or perforated metal sheet of the hydrogen storage alloy electrode. In the thus formed electrode assembly having a cylindrical roll configuration, the base of the isosceles triangle exists on a plane perpendicular to the axis of the cylindrical roll, and the margins with no aperture are on the upper and lower parts of the cylindrical roll.

Nickel-Hydrogen Storage Battery

Figure 5:
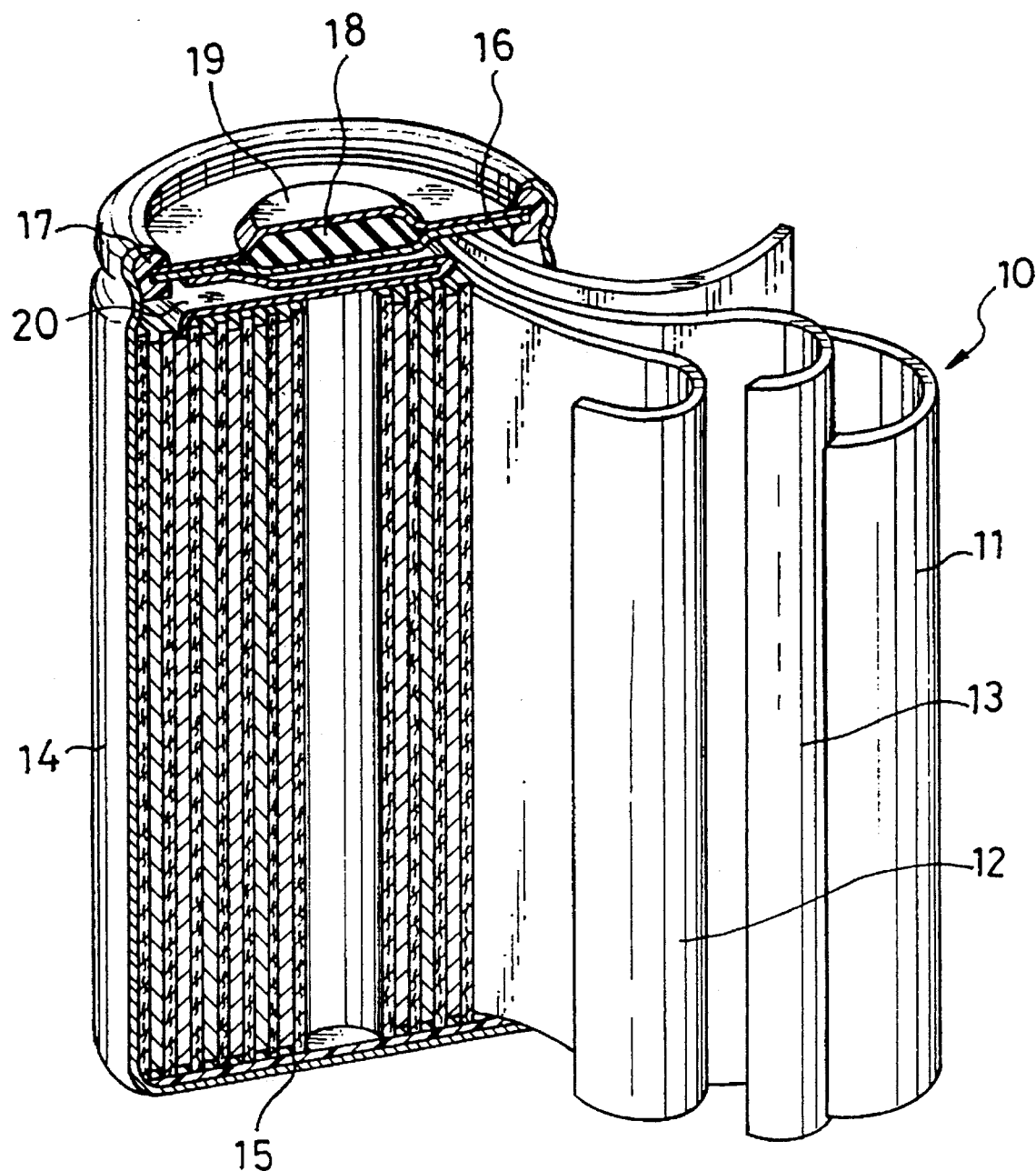
FIG. 5 is a partly cut-out fragmentary perspective view showing a nickel-metal hydride storage battery in an embodiment of the present invention.

FIG. 5 is a partly cut-out perspective view showing a structure of a nickel-metal hydride storage battery configured with one of the above-mentioned electrode assemblies. The electrode assembly 10 comprises a negative electrode 11 of the hydrogen storage alloy electrode, a positive electrode 12 and a separator 13. A battery enclosure 14 made of nickel-plated steel accommodates the electrode assembly 10 and an insulator disk 15 placed on the inside bottom of the enclosure. Although not specifically illustrated in the drawing, a lead plate of the negative electrode is welded to battery enclosure 14. A top end of the battery enclosure 14 is gas-tightly and liquid-tightly closed with a sealing disk 16 and an annular insulator ring 17. The sealing disk 16 is provided with a safety valve unit which is configured by combining an undisclosed vent hole provided on the sealing disk 16, a rubber valve body 18 and a cap 19 for holding the rubber valve body 18. The valve unit is configured in a manner that it actuates itself when the inner pressure inside the battery enclosure exceeds a predetermined value. A lead plate 20 of the positive electrode 12 is welded to the sealing disk 16.

Evaluation

Batteries A through J were produced respectively with the above-mentioned Electrodes A through J. On each of Batteries A through J, a cycle life test was performed by repeating the charging and discharging cycles in a mode of charging at a constant current of 1400 mA for 1.5 hours, then standing still for 1 hour and thereafter discharging at a constant current of 1400 mA until the battery voltage decreased to 1.0 V. A cycle wherein the discharge capacity drops to 60% of the initial value was regarded to be the end of life of the battery subjected to the test. The results of the tests are summarized in Table 1.

TABLE 1

| Battery | SBR composition (ratio by weight) | | Added SBR proportion (part by weight for 100 parts of alloy powder) | Cycle life (cycles) |
| --- | --- | --- | --- | --- |
| | Styrene | Butadiene | | |
| A | 100 | 68 | 0.8 | 521 |
| B | 100 | 40 | 0.8 | 432 |
| C | 100 | 90 | 0.8 | 441 |
| D | 100 | 68 | 0.4 | 462 |
| E | 100 | 68 | 2.0 | 456 |
| F | 100 | 20 | 0.8 | 252 |
| G | 100 | 120 | 0.8 | 261 |
| H | 100 | 68 | 0.1 | 245 |
| I | 100 | 68 | 3.0 | 152 |
| J | (PTFE) | | 0.8 | — |

As clearly shown in Table 1, the cycle life of the electrode greatly differs in compliance with the styrene to butadiene weight ratio in SBR and the proportion of SBR added to the mixture. It is therefore appreciated that with the progress of the charging and discharging cycles, changes attributable to the ratio and the proportion will be induced by the falling-off of the hydrogen storage alloy powder from the punched or perforated metal sheet and also by increase of the contact resistance among the alloy powder particles.

Battery H, wherein the amount of SBR added to the mixture is 0.1 part by weight for 100 parts by weight of the hydrogen storage alloy powder, had a short cycle life of 245 cycles, presumably attributable to the falling-off of the hydrogen storage alloy powder from the punched or perforated metal sheet.

Further, Battery I, wherein the amount of SBR added to the mixture is 3.0 parts by weight for 100 parts by weight of the hydrogen storage alloy powder, had a shorter cycle life of 152 cycles. The reason for this is believed that the capacity of the negative electrode is originally small with the large amount of SBR included in the electrode, and that the battery capacity is decreased by a leakage of the electrolyte caused by the false in the inner pressure of the battery enclosure with the progress of the charging and discharging cycles.

Battery J, wherein PTFE which had conventionally been used as the binding medium was employed instead of SBR, failed to be charged from the first cycle, because 70% or more of the hydrogen storage alloy powder was fallen off from the punched or perforated metal sheet during the production of the electrode assembly.

EXAMPLE 2

Electrode Mixture

In a manner similar to those in Example 1, a hydrogen storage alloy, whose composition is represented by the formula: $MmNi_{3.55}Co_{0.75}Mn_{0.4}Al_{0.3}$, was pulverized by a grinding mill to a powder having a particle size of 37 μm or smaller, and was soaked in a hot alkaline aqueous solution. To 100 parts by weight of the hydrogen storage alloy powder, added 0.15 parts by weight of CMC, 0.30 parts by weight of carbon black, 0.8 parts by weight of SBR whose styrene to butadiene weight ratio is 100:68, and 14 parts by weight of water as a dispersing medium or dispersant, and the whole was kneaded to prepare a paste.

Electrode

The punched or perforated metal sheet similar to that in Example 1 was coated on both surfaces with the above-mentioned paste, then dried, and pressed, and thereafter cut into the individual electrodes each having the predetermined size. On both surfaces of the individual electrodes, a water-repellent layer of 0.5 mg/cm$^2$ was provided by spray-painting an aqueous dispersion of PTFE. This was named Electrode K.

Nickel-metal Hydride Storage Battery

23/1 By using this electrode, a nickel-metal hydride battery (Battery K) was configured in a manner similar to those in Example 1.

23/2 In a manner similar to the above, except for the specified amounts of CMC added to 100 parts by weight of the hydrogen storage alloy powder, Batteries L (CMC: 0.05 parts by weight), M (CMC: 2.00 parts by weight), and Q (comparative example, CMC: 3.00 parts by weight) were produced.

23/3 Further, in a manner similar to the process performed in the production of Battery K, except for the amount of CMC of 0.15 parts by weight for 100 parts by weight of the hydrogen storage alloy powder and the specified amounts of the carbon black, Batteries N (carbon black: 0.10 part by weight), P (carbon black: 1.50 parts by weight), R (comparative example, carbon black: 0.01 part by weight), and S (comparative example, carbon black: 2.50 parts by weight) were produced.

Moreover, Batteries T, U, V and W of comparative examples were configured with an electrode without addition of carbon black, an electrode without addition of CMC, an electrode provided with no water-repellent layer, an electrode provided with a PTFE layer of 1.5 mg/cm$^2$, respectively.

On the bottom plate of the battery enclosure of each of the above-mentioned batteries, an aperture having a diameter of 1.0 mm is provided for accommodating a pressure sensor and sealed again.

Evaluation

The inner pressures of the battery enclosures of the respective batteries were measured after charging them at a constant current of 1400 mA for 2 hours. The results of the measurements are summarized in Table 2.

TABLE 2

| Battery | Proportion of added CMC (parts by weight/100 parts by weight of alloy) | Proportion of added carbon black | Adhered amount of fluoro-carbon resin on the electrode surface (mg/cm$^2$) | Inner pressure of battery enclosure (kg/cm$^2$) |
|---|---|---|---|---|
| K | 0.15 | 0.30 | 0.50 | 2.3 |
| L | 0.05 | 0.30 | 0.50 | 4.2 |
| M | 2.00 | 0.30 | 0.50 | 5.2 |
| N | 0.15 | 0.10 | 0.50 | 5.4 |
| P | 0.15 | 1.50 | 0.50 | 4.9 |
| Q | 3.00 | 0.30 | 0.50 | 15.3 |
| R | 0.15 | 0.01 | 0.50 | 20.1 |
| S | 0.15 | 2.50 | 0.50 | 14.6 |
| T | 0.15 | — | 0.50 | 38.1 |
| U | — | 0.30 | 0.50 | 25.3 |
| V | 0.15 | 0.30 | — | 18.3 |
| W | 0.15 | 0.30 | 1.50 | 16.2 |

From a comparison of Battery K with Battery U in Table 2, an advantage attributable to the addition of CMC is apparent. That is, by the addition of CMC, a hydrophilic property is provided on the electrode and the water consumption rate according to the reaction of the formula (1) is accelerated, thereby decreasing the inner pressure of the battery enclosure. As shown by the result obtained with Battery Q, CMC added in an excessive proportion however adversely influences to decrease the hydrophobic property in the vicinity of the hydrogen storage alloy, and the hydrogen gas absorption rate in accordance with the reactions of the formulae (2) and (5) is lowered accordingly, thereby raising the inner pressure of the battery enclosure.

On the other hand, from a comparison of Battery K with Battery R, it is apparent that the addition of carbon black provides the electrode with a hydrophobic property, thereby decreasing the inner pressure of the battery enclosure. As shown by the result obtained with Battery S, carbon black added in an excessive proportion however adversely influences to decrease the hydrophilic property inside the electrode, thereby raising the inner pressure of the battery enclosure.

Further, from a comparison of Battery K with Battery V, it is appreciated that the provision of the water-repellent layer on the surface of the electrode contributes to accelerate the oxygen gas absorption rate, thereby lowering the inner pressure of the battery enclosure. However, if the adhered amount of the water-repellent agent is excessive, the internal resistance of the battery becomes high, thereby decreasing the discharge voltage of the battery. As shown by the result obtained with Battery W, the excessively added water-repellent agent inactivates the reaction of the formula (5) inside the electrode, thereby raising the inner pressure.

EXAMPLE 3

Electrode Mixture

In a manner similar to those in Example 1, a powder of a hydrogen storage alloy, whose composition is represented by the formula: $MmNi_{3.55}Co_{0.75}Mn_{0.4}Al_{0.3}$, pulverized to have a particle size of 37 μm or smaller, was soaked in a hot alkaline aqueous solution, washed with water and then dried. To 100 parts by weight of the hydrogen storage alloy powder, added 0.15 parts by weight of CMC, 0.30 parts by weight of carbon black, 0.80 parts by weight of SBR whose styrene to butadiene weight ratio is 100:68, and 14 parts by weight of water as a dispersing medium or dispersant, and the whole was kneaded to prepare a paste.

Battery (a).

A punched or perforated metal sheet of a thickness of 60 μm was prepared with a perforation pattern of an aperture ratio of 43%, with a plurality of isosceles triangles, which had a vertical angle of 56° and base angles of 62° and formed with lines linking any three centers of the adjacent apertures. The punched metal sheet was coated with the above-mentioned paste, and the coated sheet was then dried and pressed. After coating both surfaces of the sheet with an aqueous dispersion of PTFE by spraying to provide a water-repellent layer of 0.5 mg/cm$^2$, the resultant sheet was cut into the individual negative electrodes having the predetermined size with the margins with no aperture on both peripheral edges parallel to the lengthwise direction. In a manner similar to those in Example 1, Battery (a) was configured with this negative electrode.

Batteries (b) and (c)

Two kinds of punched or perforated metal sheets of a thickness of 60 μm were prepared with perforation patterns of an aperture ratio of 43%, and composed of a plurality of isosceles triangles, each of which had vertical angles of 60° and 70°, respectively, and formed with lines linking any three centers of the adjacent apertures. The punched or perforated metal sheets were used as the electrode supports, and two negative electrodes were produced in a manner similar to those mentioned above. Batteries (b) and (c) of comparative examples were configured with these negative electrodes.

Battery (d)

A punched or perforated metal sheet of a thickness of 60 μm was prepared with a perforation pattern of an aperture ratio of 43%, and composed of a plurality of isosceles triangles, each of which had a vertical angle of 56°, and formed with lines linking any three centers of the adjacent apertures. The punched or perforated sheet was used as the electrode support, and a negative electrode was produced in a manner similar to those mentioned above except that a lengthwise direction of the electrode was perpendicular to the base of the triangle. And Battery (d) of a comparative example was produced in a manner similar to those for the production of Battery (a) except that a rolling-up direction of the electrode was perpendicular instead of parallel to the base of the triangle.

Battery (e)

Battery (e) of a comparative example was produced in the same manner as the production of Battery (a), except for cutting the same bulk electrode sheet as that used in Battery (a) into individual electrodes so as to produce no margin along the both peripheral edges parallel to the lengthwise direction of the electrode.

Evaluation

Fraction defects, i.e., the proportions of the defective batteries due to short-circuiting within groups each composed of 1000 units of the respective Batteries (a) of the working example and Batteries (b), (c), (d) and (e) of the comparative examples, were measured and the results are compared. Each of the batteries before being injected with an electrolyte was subjected to a conduction test by applying a voltage of 250 V across the positive and negative electrodes. The results of the tests are summarized in Table 3.

TABLE 3

| Battery | Vertical angle (degree) | Presence of margins on the ends of sheet | Fraction defects (%) |
|---|---|---|---|
| (a) | 56 | yes | 0.1 |
| (b) | 60 | yes | 5.0 |
| (c) | 70 | yes | 19.0 |
| (d) | 56 | yes | 23.0 |
| (e) | 56 | no | 31.0 |

As clearly shown by Table 3, it is appreciated from a comparison of Battery (a) of the working example of the present invention with Batteries (b) and (c) of the comparative examples that the larger the vertical angle of the triangle in the punched or perforated metal sheet used in the electrode is, the larger becomes the fraction defects of the battery configured with the electrode due to the short-circuiting. The reason for this may be considered that in a case of rolling-up in the direction parallel to the base of a triangle formed with lines linking any three centers of the adjacent apertures, the smaller the vertical angle, the smaller the pitch in a row of the apertures. With this smaller pitch, electrode assemblies are configured in a state more approximate to a true circle of its cross section, thereby to reduce the defective negative electrode due to short-circuiting by the cracks.

Further, although Battery (e) of the comparative example used the same bulk punched or perforated metal sheet as used in Battery (a) but provided with no margins along its peripheral edges, it demonstrated the highest fraction defects. It is believed that the defective electrode has been derived from the falling-off of the electrode active material at the end faces of the electrode, and also from the defects due to short-circuiting caused by projections on the peripheral edges of the punched or perforated metal sheet which pierced through the separator during the rolling-up process.

Battery (d) of the comparative example had a perforation pattern which is obtained by rotating the perforation pattern of Battery (a) by 90° and demonstrated a large fraction defects due to short-circuiting in comparison with that of Battery (a) of the working example. The reason for this large fraction defects due to the short-circuiting may be considered that the negative electrode has been bent irregularly at the time of rolling-up in the direction perpendicular to the base of the isosceles triangle.

As has been discussed in the foregoing description, the punched or perforated metal sheet used in configuring the negative electrode is selected to have a regular perforation pattern comprising a plurality of isosceles triangles formed with lines linking any three centers of the adjacent apertures, whose vertical angle is smaller than the two base angles, and to have the margins without aperture on both peripheral edges parallel to the lengthwise direction. The electrode thus obtained is rolled-up together with the positive electrode and separator, in the direction parallel to the base of the above-mentioned isosceles triangle, thereby reducing the fraction defects due to the partial short-circuiting between the positive and negative electrodes in great deal.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A hydrogen storage alloy electrode comprising,
    an electrically conductive support made of a punched or perforated metal sheet, said sheet having a plurality of apertures arranged in a repetitive perforation pattern, each aperture having a center and a diameter in a range from 1.0 mm to 2.5 mm, where lines linking the centers of any three adjacent apertures form an isosceles triangle having a vertical angle smaller than both base angles, said sheet being provided with margins with no apertures along at least a pair of facing peripheral edges of the sheet,
    a mixture supported on said conductive support and
    a water-repellent agent for giving a water-repellent property on an entire surface of the electrode, said mixture comprising a hydrogen storage alloy powder, a styrene-butadiene copolymer having a styrene to butadiene weight ratio in a range of 100:30 to 100:100 as a binder, a polymeric material for giving a hydrophilic property inside the electrode, and carbon black.

2. A hydrogen storage alloy electrode in accordance with claim 1, wherein a proportion of the styrene-butadiene copolymer in said mixture is in a range from 0.3 to 2.0 parts by weight for 100 parts by weight of the hydrogen storage alloy powder.

3. A hydrogen storage alloy electrode in accordance with claim 1, wherein said vertical angle of the isosceles triangle is in a range from 46° to 58° and the base angles are in a range from 67° to 61°.

4. A hydrogen storage alloy electrode in accordance with claim 1, wherein said punched or perforated metal sheet has a thickness in a range from 40 μm to 80 μm and an aperture ratio of the perforated region in a range from 35% to 61%.

5. A hydrogen storage alloy electrode in accordance with claim 1, wherein said polymeric material for giving a hydrophilic property inside the electrode is a sodium salt of carboxymethyl cellulose and a proportion of said salt added to said mixture is in a range from 0.05 to 2.0 parts by weight for 100 parts by weight of the hydrogen storage alloy powder.

6. A hydrogen storage alloy electrode in accordance with claim 1, wherein a proportion of said carbon black added to said mixture is in a range from 0.05 to 1.5 parts by weight for 100 parts by weight of the hydrogen storage alloy powder.

7. A hydrogen storage alloy electrode in accordance with claim 1, wherein said water-repellent agent is polytetrafluoroethylene or a copolymer of tetrafluoroethylene and hexafluoropropylene, and an amount of said water-repellent agent adhered to unit surface area of the electrode is in a range from 0.1 to 1.0 mg/cm$^2$.

8. A hydrogen storage alloy electrode in accordance with claim 1, wherein said punched or perforated metal sheet is rolled-up in a cylindrical roll with a spiral section in a manner that the base of said isosceles triangle exists on a plane perpendicular to an axis of said cylindrical roll.

9. A sealed nickel-metal hydride storage battery comprising an electrode assembly including a negative electrode composed of the hydrogen storage alloy electrode in accordance with claim 1, a nickel positive electrode and a separator, an alkaline electrolyte, and a sealed battery enclosure provided with a safety valve unit for accommodating said electrode assembly and said electrolyte.

10. A sealed nickel-metal hydride storage battery comprising an electrode assembly including a negative electrode composed of the hydrogen storage alloy electrode in accordance with claim 8, a nickel positive electrode and a separator, an alkaline electrolyte, and a sealed battery enclosure provided with a safety valve unit for accommodating said electrode assembly and said electrolyte.

11. A sealed nickel-metal hydride storage battery comprising;

an electrode assembly including a negative hydrogen storage alloy electrode, a nickel positive electrode and a separator;

an alkaline electrolyte;

and a sealed battery enclosure provided with a safety valve unit for accommodating said electrode assembly and said electrolyte; wherein said hydrogen storage alloy electrode comprises an electrically conductive support made of a punched or perforated metal sheet, a mixture supported on said conductive support, and a water-repellent agent for giving a water-repellent property on an entire surface of the electrode, said mixture comprises a hydrogen storage alloy powder, a styrene-butadiene copolymer as a binder, a polymeric material for giving a hydrophilic property inside the electrode, and carbon black; and said punched or perforated metal sheet has a regular perforation pattern comprising a plurality of apertures having a diameter in a range from 1.0 mm to 2.5 mm arranged in isosceles triangles which satisfy a condition that lines linking any three centers of adjacent apertures form an isosceles triangle whose vertical angle is smaller than its two base angles, and has margins without apertures along at least a pair of facing edges of the sheet.

12. A sealed nickel-metal hydride storage battery in accordance with claim 11, wherein said hydrogen storage alloy electrode is rolled-up in a cylindrical roll with a spiral section in a manner that the base of said isosceles triangle exists on a plane perpendicular to an axis of said cylindrical roll.

13. A sealed nickel-metal hydride storage battery in accordance with claim 12, wherein said styrene-butadiene copolymer has a styrene to butadiene weight ratio in a range of 100:30 to 100:100, and a proportion of the copolymer in said mixture is in a range from 0.3 to 2.0 parts by weight for 100 parts by weight of the hydrogen storage alloy powder, said polymeric material for giving a hydrophilic property inside the electrode is a sodium salt of carboxymethyl cellulose and a proportion of said salt in said mixture is in a range from 0.05 to 2.0 parts by weight for 100 parts by weight of the hydrogen storage alloy powder, a proportion of said carbon black in said mixture is in a range from 0.05 to 1.5 parts by weight for 100 parts by weight of the hydrogen storage alloy powder, and said water-repellent agent is polytetrafluoroethylene or a copolymer of tetrafluoroethylene and hexafluoropropylene, and an amount of said water-repellent agent adhered to unit surface area of the electrode surface is in a range from 0.1 to 1.0 mg/cm$^2$.

14. A sealed nickel-metal hydride storage battery in accordance with claim 13, wherein said punched or perforated metal sheet has a thickness in a range from 40 μm to 80 μm and an aperture ratio in a range from 35% to 61% and wherein said vertical angle of the isosceles triangle is in a range from 46° to 58°and the base angles are in a range from 67° to 61°.

15. A sealed nickel-metal hydride storage battery comprising;

an electrode assembly including a negative electrode having a hydrogen storage alloy electrode, a nickel positive electrode and a separator;

an alkaline electrolyte;

and a sealed battery enclosure provided with a safety valve unit for accommodating said electrode assembly and said electrolyte; wherein said hydrogen storage alloy electrode comprises an electrically conductive support made of a punched or perforated metal sheet and a mixture composed mainly of a hydrogen storage alloy powder, said punched or perforated metal sheet has a regular perforation pattern comprising a plurality of apertures having a diameter in a range from 1.0 mm to 2.5 mm arranged in isosceles triangles which satisfy a condition that its vertical angle of the triangle formed with lines linking any three centers of the adjacent apertures is in a range from 46° to 58° and base angles of said isosceles triangle are in a range from 67° to 61°, and has margins without aperture along at least a pair of peripheral edges parallel to the base of said isosceles triangle, said electrode assembly is rolled-up in a cylindrical roll with a spiral section in a manner that the base of said isosceles triangle exists on a plane perpendicular to an axis of said cylindrical roll.

16. A sealed nickel-metal hydride storage battery in accordance with claim 15, wherein said punched or perforated metal sheet has a thickness in a range from 40 µm to 80 µ and an aperture ratio of the perforated region in a range from 35% to 61%.

\* \* \* \* \*